No. 715,274. Patented Dec. 9, 1902.
J. KONIGSBERG.
FISHING REEL.
(Application filed Feb. 26, 1902.)
(No Model.)
2 Sheets—Sheet 1.

Witnesses:
John A. Rennie
George Barry Jr.

Inventor:
Joseph Konigsberg
By Brown & Seward
his Attorneys

No. 715,274. Patented Dec. 9, 1902.
J. KONIGSBERG.
FISHING REEL.
(Application filed Feb. 26, 1902.)
(No Model.) 2 Sheets—Sheet 2.

Witnesses:
John A. Rennie
George Barry Jr.

Inventor:
Joseph Konigsberg
By Brown & Seward
his Attorneys

UNITED STATES PATENT OFFICE.

JOSEPH KONIGSBERG, OF NEW YORK, N. Y.

FISHING-REEL.

SPECIFICATION forming part of Letters Patent No. 715,274, dated December 9, 1902.

Application filed February 26, 1902. Serial No. 95,735. (No model.)

*To all whom it may concern:*

Be it known that I, JOSEPH KONIGSBERG, a citizen of the United States, and a resident of the borough of Manhattan, in the city and State of New York, have invented a new and useful Fishing-Reel, of which the following is a specification.

My invention relates to a fishing-reel of the type commonly used in connection with rods for casting and hauling lines while fishing.

The object is to provide a reel of this character in which the crank for turning the reel may be thrown out of and into active engagement with the reel, so that it will not be liable to injure the hand of the fisherman in casting and will at the same time be in position to be promptly engaged with the reel in turning it to haul in the line.

A practical embodiment of my invention is represented in the accompanying drawings, in which—

Figure 1:
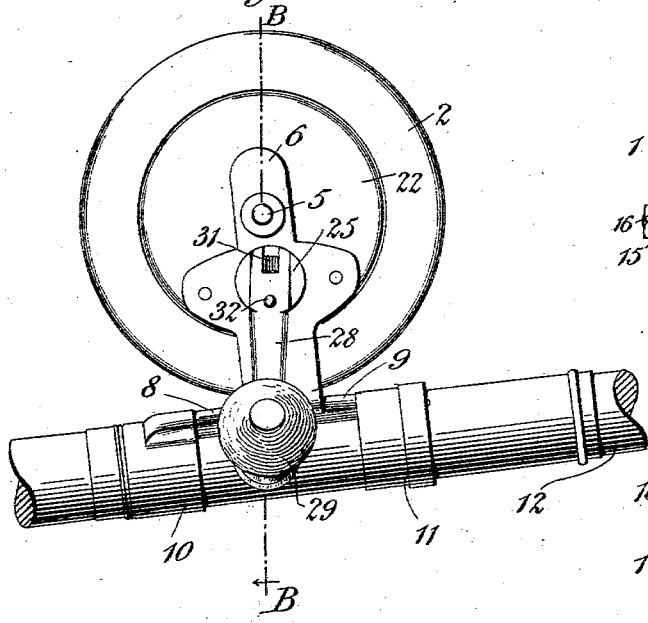
Figure 2:
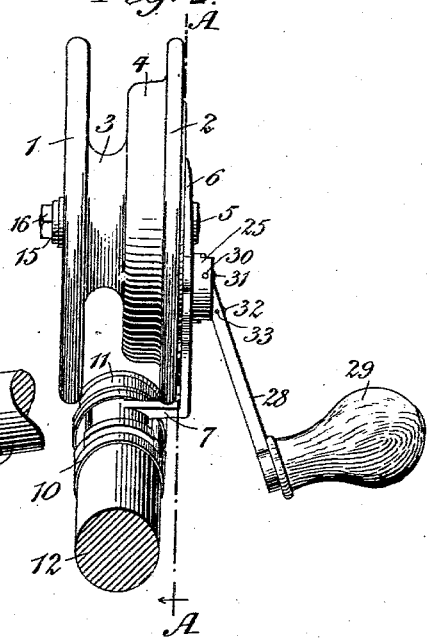
Figure 3:
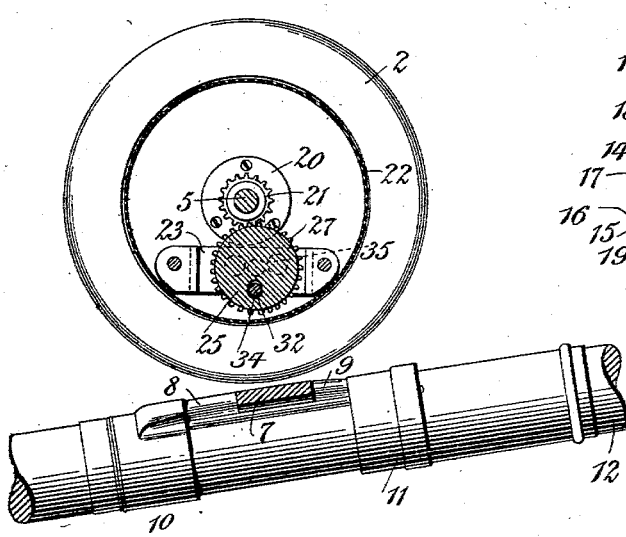
Figure 4:
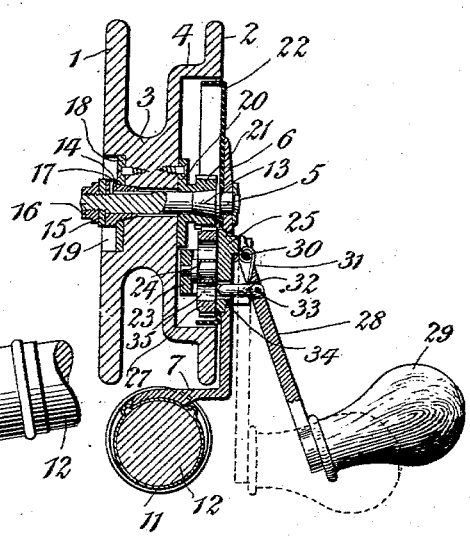
Figure 5:
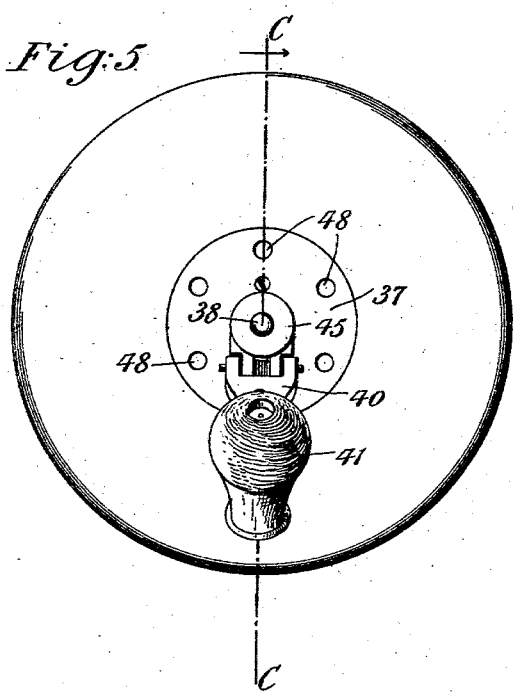
Figure 6:
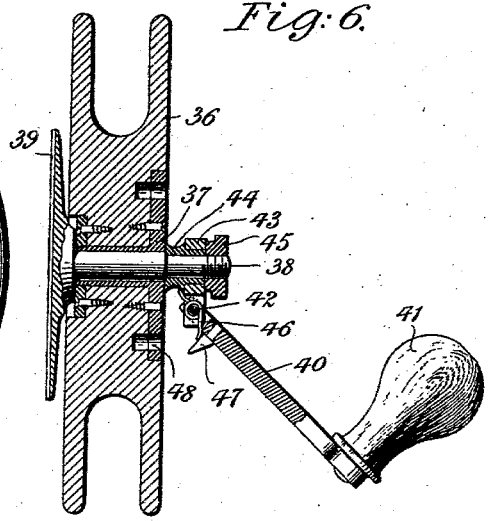
Figure 7:
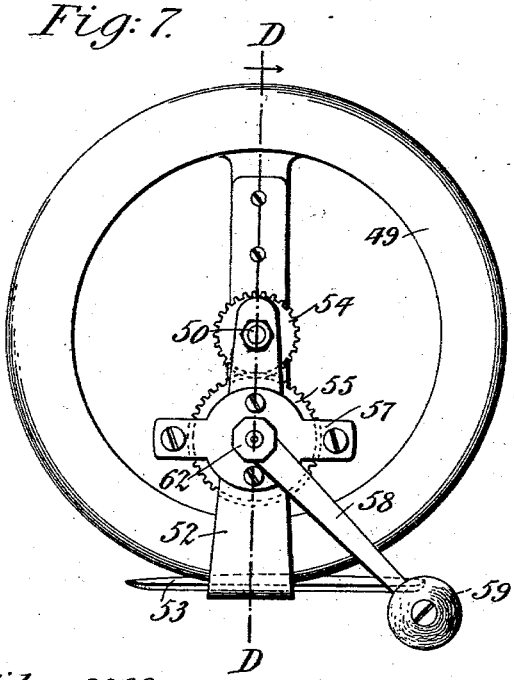
Figure 8:
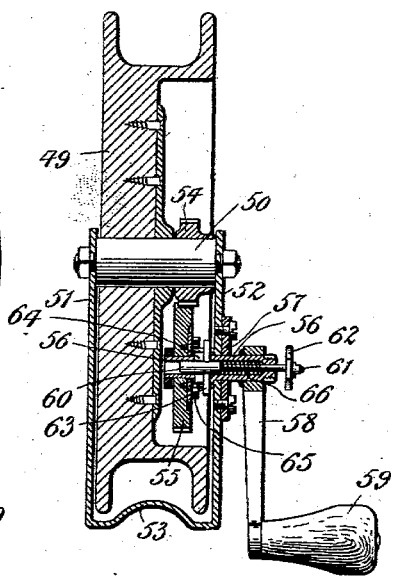

Figure 1 is a view of the reel in side elevation as it appears when in position on the rod. Fig. 2 is a view of the same in edge elevation. Fig. 3 is a section taken in the plane of the line A A of Fig. 2. Fig. 4 is a section taken in the plane of the line B B of Fig. 1. Fig. 5 is a view in side elevation in detail of a modified form of reel in which the multiplying-gear is omitted. Fig. 6 is a section of the same, taken in the plane of the line C C of Fig. 5. Fig. 7 represents another modified form; and Fig. 8 is a section of the same, taken in the plane of the line D D of Fig. 7.

Referring to the form shown in Figs. 1 to 4, inclusive, the flanges of the reel are denoted by 1 and 2. They are connected by a barrel composed of a section 3 of lesser diameter and a section 4 of greater diameter, the intention being that the space from the exterior of the section 4 to the peripheries of the flanges will be sufficient to retain a length of line ample for ordinary use, while an additional length of line for extraordinary use may be stored on the smaller section 3 of the barrel between its periphery and the periphery of the section 4 of the barrel. The reel is mounted on a stub-axle 5, extending laterally from the upper portion of a standard 6, the latter being provided with a base 7, offset from the standard 6 toward the position which the reel is to occupy, the said offset portion 7 being provided with concave-faced branches 8 and 9 to enter the space provided between the bands 10 and 11 on the rod 12, as is usual. The stub-axle 5 is provided with a cone-bearing 13, fixed to or formed integral with it near its inner end, or the end fastened to the upright 6, and near its end there is a cone-bearing 14, arranged to slide on the stub-axle and held in place by means of a washer 15 and nut 16, screwed onto the outer end of the stub-axle. The cone-bearing 14 is provided with an oil-passage 17 for distributing oil onto the axle between the bearings 13 and 14. The reel is provided with a bearing-plate 18, fixed in the bottom of a recess 19, formed in the side of the reel and adapted to engage the cone-bearing 14, and on the opposite side the reel is provided with a bearing-plate 20, having integral therewith a pinion 21, the said pinion being cored to fit the bearing 13 on the stub-axle. Intermediate of the pinion 21 and the standard 6 there is a shallow cup-shaped plate 22, forming a housing for the gear, the said housing 22 surrounding the stub-axle 5 and fixed to the standard 6. The standard 6 has fixed to its inner face a yoke 23, in which is journaled a stud 24, projecting inwardly from and fixed to a disk 25, mounted to rotate in a circular opening in the standard and held in position by the overlapping edge 26 of the circular opening in which the disk 25 rotates. On the stud 24 a gear-wheel 27 is loosely mounted in mesh with the pinion 21 and is adapted to serve as a drive-wheel for operating the pinion 21, and hence the reel, when the crank is connected with it or to work idly on the stud 24 when the crank is detached from it. The operating-crank is denoted by 28 and is provided with a handle 29 for convenience in operating it. The upper end of the crank is mounted on a pivot 30, extending between the projecting sides of the disk 25, so as to permit the crank to swing outwardly into the position shown in full lines, Fig. 4, and inwardly into the position shown in dotted lines in the same figure, and a spring 31, coiled around the pivot 30, has its free end so engaged with the crank and with the standard 6 that the tension of the spring tends to hold the crank normally in the position shown in full lines, Fig. 4. A locking-pin 32 is pivoted to the crank at 33 and works through an opening 34 in the disk 25 to enter some one of the several perforations 35, arranged in a concentric line around the axis of the gear-wheel 27, when the crank is moved inwardly against the tension of the spring 31 into the position shown in dotted lines in Fig. 4.

In operation when the line is cast the crank occupies the position shown in full lines in Fig. 4 out of connection with the wheel 27, and hence the latter works idly as the reel whirls at a high speed to pay off the line. This removes what has proved a source of annoyance and injury in that it permits the crank to remain quietly during this rapid rotary movement of the wheel instead of whirling around with it, where it is liable to strike the hand or fingers of the fisherman holding the pole. When, however, it is desired to reel in the line, the fisherman grasping the handle 29 presses inwardly against the tension of the spring 31, thereby locking the wheel 27 to the crank, and by turning the latter the multiplying-gear is set in operation and the reel is rapidly rotated in the proper direction to haul in the line. When for any cause in playing the fish there comes need for paying out line, the moment the handle 29 is released it flies out of connection with the gear-wheel, permitting the line to run freely until there is need for again checking it and reeling it in.

In Figs. 5 and 6 there is shown a simpler and less expensive form of my invention, in which the multiplying-gear is omitted, the reel in this instance being denoted by 36 and mounted by means of the proper flanged bushing 37 on a stub-axle 38, projecting from a base 39, adapted to engage a rod. A crank 40, with its handle 41, is pivoted at 42 between lugs projecting from a ring 43, mounted to rotate on the collar 44, held on the stub-axle 38 by the nut 45. The crank 40 is held normally out of engagement with the reel by a spring 46, coiled around its pivot 42, and a pin 47, fixed to the crank 40, is adapted when the crank is pressed inwardly to engage one or another of the sockets 48, formed in the face of the reel. Like the form already described the reel is left free to run independently of the crank in casting the line, while at any time the line may be reeled in by simply pressing the crank toward the reel, so that the pin 47 shall engage with it.

In Figs. 7 and 8 I have shown another form of my invention, in which the crank is positively engaged with and disengaged from the driving gear-wheel by other means than by a movement of the crank itself. In this form of my invention the reel is denoted by 49 and is loosely mounted on an axle 50, supported between a pair of standards 51 52, uprising from a base 53, fitted to engage a rod in the usual manner. In this structure the pinion 54, fixed to rotate with the reel, is driven by the gear-wheel 55, mounted on a shaft 56, journaled in the standard 52 and in the reinforcing-plate 57, fixed to the standard, and has fixed thereto a crank 58, provided with a handle 59. The shaft 56 is hollow and is provided with a plunger 60, having a rod 61 extended through the outer end of the shaft and provided with an operating wheel or disk 62. The plunger 60 is provided with a cross-pin 63, extending laterally in an elongated slot 64, formed in the wall of the shaft and adapted to be moved, together with the plunger, into and out of engagement with teeth 65 on the face of the wheel 55 for the purpose of locking the wheel to the shaft and releasing it therefrom. A coil-spring 66, located within the shaft between the head of the plunger and the head of the shaft, has a tendency to throw the plunger inwardly to engage the cross-pin 63 with the wheel 55, said plunger being held at the limit of its outward movement to release the wheel 55 by the engagement of its cross-pin 63 with laterally-extended notches in the walls of the slot 64, the said notches being in such position in the drawing Fig. 8 as to be concealed by the cross-pin, the structure being substantially the well-known bayonet-joint.

It is evident that changes might be resorted to in the form, construction, and arrangement of the several parts without departing from the spirit and scope of my invention. Hence I do not wish to limit myself strictly to the structure herein set forth; but

What I claim is—

1. The combination with a fishing-reel mounted on its axle and a standard forming a support for the axle, of a crank provided with a pin for engaging the crank with and disengaging it from the reel, the said crank being mounted to swing toward and away from the side of the reel and a spring for holding the crank normally disengaged with the reel.

2. The combination with a fishing-reel, of a crank for operating the reel and means for automatically disconnecting the crank from the reel and for positively connecting it with the reel, substantially as set forth.

3. The combination with a fishing-reel, of a crank for operating the reel, a spring for holding the crank normally out of engagement therewith and means whereby the pressure of the crank against the tension of the spring will connect the crank with the reel, substantially as set forth.

4. The combination with a fishing-reel, of a multiplying-gear for operating the reel, a crank and means for connecting the crank to and disconnecting it from the drive-wheel of the multiplying-gear, substantially as set forth.

5. The combination with a reel, of a multiplying-gear for operating the reel, a crank and means for automatically disconnecting the crank from the drive-wheel of the multiplying-gear and means whereby the crank may be pressed into engagement with the drive-wheel, at pleasure, substantially as set forth.

6. The combination with a reel having the barrel connecting its flanges formed of sections of different diameters, of means for operating the reel, substantially as set forth.

7. The combination with a reel, mounted on its axle, and a standard forming a support for the axle, the said reel being provided with a pinion fixed to rotate therewith, and a drive gear-wheel loosely mounted on the standard, of a crank provided with a pin for engaging and disengaging the said drive-wheel, the said crank being mounted to swing toward and away from the side of the wheel and a spring for holding the crank normally disconnected with the drive gear-wheel, substantially as set forth.

In testimony that I claim the foregoing as my invention I have signed my name, in presence of two witnesses, this 25th day of February, 1902.

JOSEPH KONIGSBERG.

Witnesses:
 FREDK. HAYNES,
 HENRY THIEME.